US009542907B2

(12) United States Patent
Kocienda et al.

(10) Patent No.: US 9,542,907 B2
(45) Date of Patent: Jan. 10, 2017

(54) CONTENT ADJUSTMENT IN GRAPHICAL USER INTERFACE BASED ON BACKGROUND CONTENT

(71) Applicant: Apple Inc., Cupertino, CA (US)

(72) Inventors: Ken Kocienda, San Jose, CA (US); Chanaka G. Karunamuni, San Jose, CA (US); Joshua H. Shaffer, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 591 days.

(21) Appl. No.: 14/027,047

(22) Filed: Sep. 13, 2013

(65) Prior Publication Data

US 2014/0362105 A1    Dec. 11, 2014

Related U.S. Application Data

(60) Provisional application No. 61/832,947, filed on Jun. 9, 2013.

(51) Int. Cl.
*G09G 5/02* (2006.01)
*G06F 9/44* (2006.01)
*G09G 5/00* (2006.01)

(52) U.S. Cl.
CPC .............. *G09G 5/02* (2013.01); *G06F 9/4443* (2013.01); *G09G 5/00* (2013.01);
(Continued)

(58) Field of Classification Search
CPC ........................................................ G09G 5/02
See application file for complete search history.

(56) References Cited

U.S. PATENT DOCUMENTS

| 5,805,163 A | 9/1998 | Bagnas |
| 5,831,615 A | 11/1998 | Drews et al. |

(Continued)

FOREIGN PATENT DOCUMENTS

| KR | 2005-0120343 | 12/2005 |
| KR | 20070059810 | 6/2007 |
| TW | 201246073 A1 | 11/2012 |

OTHER PUBLICATIONS

Notice of Allowance, dated Dec. 14, 2015, received in Taiwanese Patent Application No. 103119126, which corresponds with U.S. Appl. No. 14/183,383, 3 pages.

(Continued)

*Primary Examiner* — Barry Drennan
*Assistant Examiner* — Richard M Russell
(74) *Attorney, Agent, or Firm* — Morgan, Lewis & Bockius LLP

(57) ABSTRACT

Adjustments to content to be rendered on top of background content, such as wallpaper, in a graphical user interface are disclosed. One example method can include adjusting a color characteristic of new content to be rendered on top of the background content, based on at least one color characteristic of the background content, so as to preserve the new content's color. Another example method can include adjusting a color characteristic of text to be rendered on top of the background content, based on at least one color characteristic of the background content, so that the text is legible.

18 Claims, 25 Drawing Sheets
(18 of 25 Drawing Sheet(s) Filed in Color)

(52) U.S. Cl.
CPC .......... *G09G 2320/066* (2013.01); *G09G 2320/0666* (2013.01); *G09G 2340/10* (2013.01); *G09G 2340/14* (2013.01)

(56) References Cited

U.S. PATENT DOCUMENTS

| | | | |
|---|---|---|---|
| 6,151,030 | A | 11/2000 | DeLeeuw et al. |
| 6,954,905 | B2 | 10/2005 | Brown et al. |
| 7,739,613 | B2 | 6/2010 | Lindsay |
| 7,956,869 | B1 | 6/2011 | Gilra |
| 8,091,038 | B1* | 1/2012 | Johnson ............ G06F 3/0481 345/207 |
| 8,191,003 | B2 | 5/2012 | Brown et al. |
| 8,264,499 | B1* | 9/2012 | Landry ............ H04N 5/57 345/581 |
| 8,339,413 | B2 | 12/2012 | Miller et al. |
| 8,587,596 | B2 | 11/2013 | Mejdrich et al. |
| 2002/0044686 | A1* | 4/2002 | Yamazaki ............ G06T 11/60 382/167 |
| 2003/0065590 | A1 | 4/2003 | Haeberli |
| 2003/0112253 | A1 | 6/2003 | Cazier et al. |
| 2004/0179017 | A1 | 9/2004 | Martyn et al. |
| 2006/0129933 | A1 | 6/2006 | Land et al. |
| 2006/0248557 | A1 | 11/2006 | Stark et al. |
| 2007/0083825 | A1 | 4/2007 | Chaudhri et al. |
| 2007/0124691 | A1 | 5/2007 | Lindsay et al. |
| 2007/0124692 | A1 | 5/2007 | Lindsay et al. |
| 2007/0192718 | A1 | 8/2007 | Voorhees et al. |
| 2008/0225315 | A1* | 9/2008 | Hoshii ............ H04N 1/32133 358/1.9 |
| 2008/0301546 | A1 | 12/2008 | Moore et al. |
| 2009/0175411 | A1 | 7/2009 | Gudmundson |
| 2010/0253697 | A1 | 10/2010 | Rivera |
| 2013/0063486 | A1* | 3/2013 | Braun ............ G09G 3/002 345/633 |
| 2013/0073963 | A1 | 3/2013 | Pendergast et al. |
| 2014/0267362 | A1 | 9/2014 | Kocienda et al. |
| 2014/0267363 | A1 | 9/2014 | Kocienda et al. |
| 2014/0363143 | A1* | 12/2014 | Dharssi ............ G06K 9/00765 386/282 |

OTHER PUBLICATIONS

International Search Report and Written Opinion, dated Oct. 24, 2014, received in International Patent Application No. PCT/US2014/037735, which corresponds with U.S. Appl. No. 14/027,047, 13 pages.

International Preliminary Report on Patentability, dated Dec. 15, 2015, received in International Patent Application No. PCT/US2014/037735, which corresponds with U.S. Appl. No. 14/027,047, 11 pages.

Office Action, dated Sep. 25, 2015, received in Korean Patent Application No. 10-2014-0063868, which corresponds with U.S. Appl. No. 14/027,047, 5 pages.

McCracken, "Windows Aero: Why I'm Glad It's Dead," http://techland.time.com/2012/05/22/windows-aero-why-im-glad-its-dead/print/>, May 22, 2012, 3 pages.

Microsoft, "What is Windows Aero", http://windows.microsoft.com/en-my/windows-vista/what-is-windows-aero>, retrieved on Sep. 1, 2015, 2 pages.

TheCodeKing, "Windows Vista Aero Glass in .NET Managed Win32 Applications," http://www.codeproject.com/Articles/17681/Windows-Vista-Aero-Glass-in-NET-Managed-Win32-Appl>, Feb. 18, 2007, 6 pages.

Office Action, dated Sep. 14, 2015, received in U.S. Appl. No. 14/183,369, 10 pages.

Office Action, dated Sep. 14, 2015, received in Taiwanese Patent Application No. 103109466, which corresponds with U.S. Appl. No. 14/183,369, 6 pages.

Notice of Allowance, dated Sep. 16, 2015, received in U.S. Appl. No. 14/183,383, 9 pages.

International Search Report and Written Opinion, dated Jun. 2, 2014, received in International Patent Application No. PCT/US2014/018728, which corresponds with U.S. Appl. No. 14/183,383, 9 pages.

International Preliminary Report on Patentability, dated Sep. 15, 2015, received in International Patent Application No. PCT/US2014/018728, which corresponds with U.S. Appl. No. 14/183,383, 7 pages.

Notice of Allowance, Notice of Acceptance, dated Apr. 28, 2016, received in Korean Patent Application No. 10-20140063868, which corresponds with U.S. Appl. No. 14/027,047, 3 pages.

Letters Patent, dated May 19, 2016, received in Korean Patent Application No. 10-2014-0063868, which corresponds with U.S. Appl. No. 14/027,047, 4 pages.

Notice of Allowance, dated Feb. 4, 2016, received in U.S. Appl. No. 14/183,369, 9 pages.

Notice of Allowance, dated Jan. 29, 2016, received in U.S. Appl. No. 14/183,383, 9 pages.

Notice of Acceptance, dated Dec. 15, 2015, received in Australian Patent Application No. 2014202632, which corresponds with U.S. Appl. No. 14/027,047, 2 pages.

* cited by examiner

| Background Brightness | Background Contrast | New Content Color | Opacity Level Adjustment |
|---|---|---|---|
| $B_1$ | $C_1$ | $N_1$ | $O_1$ |
| $B_2$ | $C_2$ | $N_2$ | $O_2$ |
| ⋮ | ⋮ | ⋮ | ⋮ |
| $B_n$ | $C_n$ | $N_n$ | $O_n$ |

FIG. 5

| Background Hue | Background Saturation | Background Brightness | Text Dark Color |
|---|---|---|---|
| $H_1$ | $S_1$ | $B_1$ | $N_1$ |
| $H_2$ | $S_2$ | $B_2$ | $N_2$ |
| ⋮ | ⋮ | ⋮ | ⋮ |
| $H_m$ | $S_m$ | $B_m$ | $N_m$ |

FIG. 10

CONTENT ADJUSTMENT IN GRAPHICAL USER INTERFACE BASED ON BACKGROUND CONTENT

CROSS-REFERENCE TO RELATED APPLICATIONS

This application claims priority to U.S. Provisional Application No. 61/832,947, filed Jun. 9, 2013, the entire contents of which incorporated herein by reference.

FIELD

This relates generally to electronic devices and, more particularly, to graphical user interfaces for electronic devices.

BACKGROUND

Wallpaper images are quite popular to provide an aesthetically pleasing background in a graphical user interface on a display device. Various wallpaper images are readily available and users take advantage of that variety to customize their user interfaces to show a particular wallpaper image or to rotate between a series of images.

However, some user interface elements, e.g., icons, text, graphics, etc., can have colors and/or appearances that often blend in with the colors and textures of wallpaper so as to become almost invisible or illegible. This problem can be exacerbated on portable devices with small displays, where some user interface elements are quite small.

Conversely, some user interface elements can have colors and/or appearance that so starkly contrast with the colors and textures of the wallpaper so as to be distracting to the user. In this case, some user interface elements can open over a larger portion of the display to clash with the underlying wallpaper.

SUMMARY

This relates to adjustments to new content to be rendered on top of background content, e.g., wallpaper, in a graphical user interface so that the new content is legible and aesthetically pleasing to the user. One example method can include adjusting an opacity level of new content to be rendered on top of background content so as to preserve the color of the new content while providing a suitable transparency for the underlying background content. Another example method can include adjusting a color of new text to be rendered on top of background content so that the text is legible. Still another example method can include adjusting both new content and background content so that the new content is legible. By making adjustments, a graphical user interface can provide easily viewable and legible content regardless of the background.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 illustrates an exemplary lookup table for new content adjustment in a graphical user interface according to various examples.

FIG. 10 illustrates an exemplary lookup table for text adjustment in a graphical user interface according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to adjustments to content to be rendered on top of background content, e.g., wallpaper, in a graphical user interface so that the new content is legible and aesthetically pleasing to the user. One example method can include adjusting an opacity level of new content to be rendered on top of background content so as to preserve the color of the new content while providing a suitable transparency for the underlying background content. Another example method can include adjusting a color of text to be rendered on top of background content so that the text is legible. Still another example method can include adjusting both new content and background content so that the new content is legible. By making adjustments, a graphical user interface can provide easily viewable and legible content regardless of the background.

Figure 1:
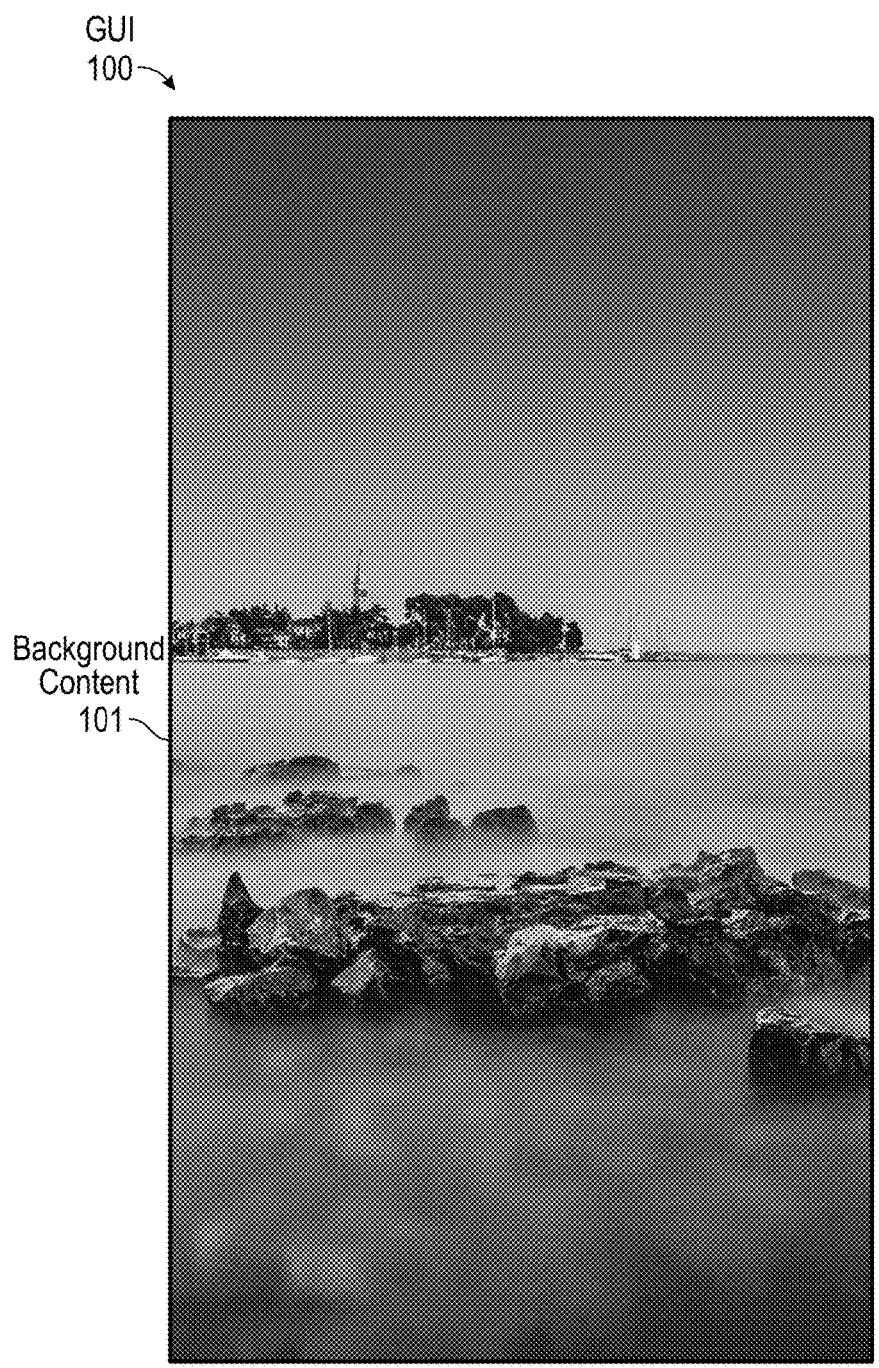
FIGS. 1 through 3 illustrate an exemplary graphical user interface with color adjusted new content rendered on top of background content according to various examples.
Figure 2:
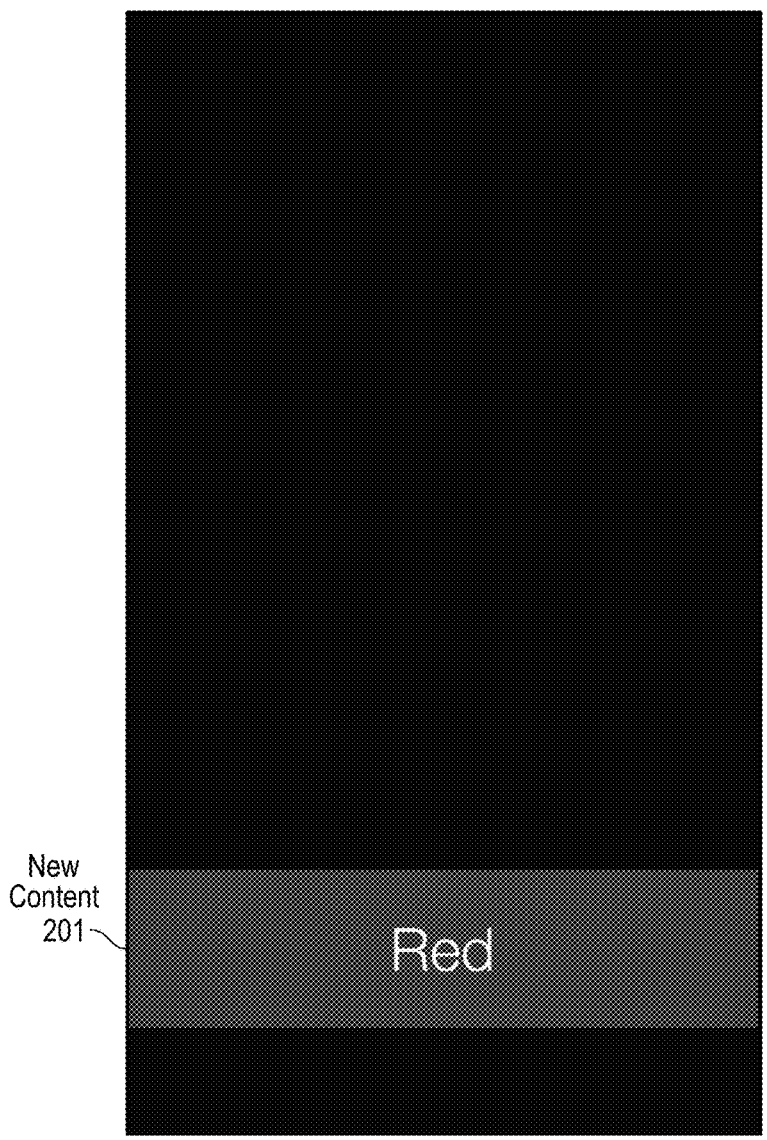
Figure 3:
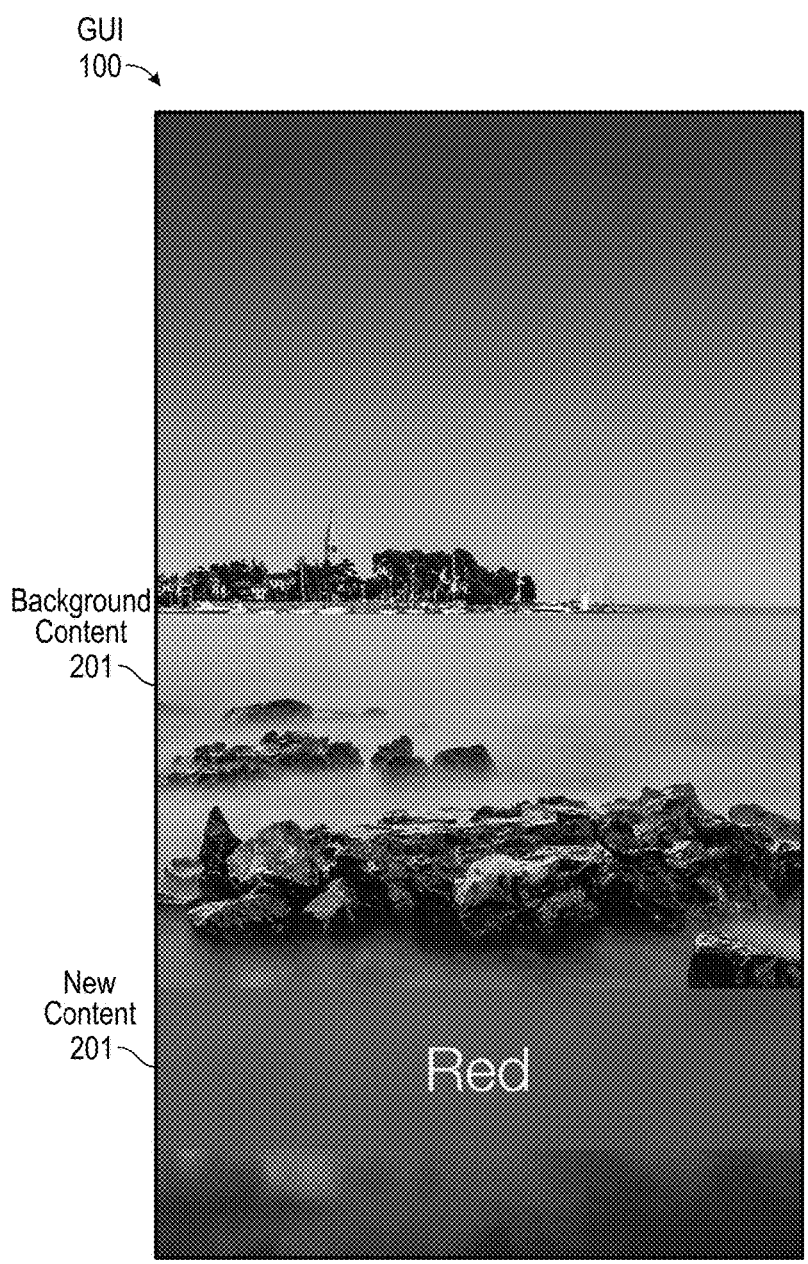

FIGS. 1 through 3 illustrate an exemplary graphical user interface in which new content can be rendered on top of background content, where certain characteristics of the new content can be adjusted so as to preserve its color regardless of the color of the background content. Accordingly, a user can perceive the same color of the new content on various backgrounds. In the example of FIG. 1, graphical user interface 100 can include background content 101 depicting an outdoor scene with a variety of colors. This content 101 can typically serve as wallpaper in a device display. In the example of FIG. 2, new content 201 can be a bright red button to be rendered on top of background content in a graphical user interface. In the example of FIG. 3, the graphical user interface 100 can include the background content 101 and the new content 201 on top of the background content. As can be seen in FIG. 3, the bright red color of the new content 201 is the same as in FIG. 2 despite having been rendered on top of a more colorful background, thereby preserving the new content's color. As a result, a user viewing the new content 201 can consistently perceive the same red color.

Figure 4:
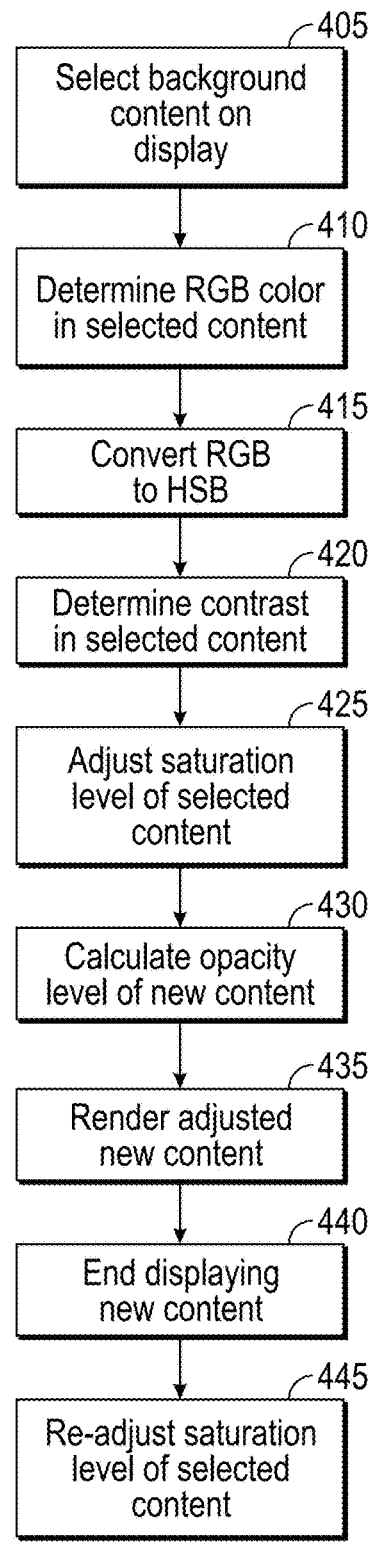
FIG. 4 illustrates an exemplary method for adjusting color of new content to be rendered on top of background content in a graphical user interface according to various examples.

FIG. 4 illustrates an exemplary method to adjust certain characteristics of new content based on background content in a graphical user interface so as to preserve the new content's color, as illustrated in FIGS. 1 through 3, for example. New content can include icons, alphanumerical text, graphics, controls, animation, and any other elements that can be rendered in a user interface. In the example of FIG. 4, background content in a graphical user interface can be selected and sampled (405). In some examples, the selected background content can be that corresponding to the position in the user interface at which the new content is to be rendered. The average red, green, and blue (RGB) values of the selected background content can be determined (410). The average RGB values can be converted to average hue, saturation, and brightness (HSB) values for further processing (415). The average contrast of the selected background content can also be determined (420).

Prior to rendering new content on top of background content, the saturation level of the background content can be adjusted to grayscale so as to prevent the colors in the selected background content from appreciably interfering with the color of the new content (425). In some examples, a color desaturation filter can be applied to the selected background content so as to render grayscale data. The opacity level of the new content can be adjusted so as to provide an appropriate level of transparency of the new content, so as to view the background content, while preserving the color of the new content. The opacity level adjustment of the new content can be computed based on the average brightness and contrast of the background content as well as the color of the new content (430). The computation can be formulated as: $O_i = f(B_i, C_i, N_i)$, where $O_i$=the opacity level adjustment of the new content, $f(\ )$=the adjustment function, $B_i$=the average brightness of the selected background content, $C_i$=the average contrast of the selected background content, and $N_i$=the color of the new content. In some examples, the adjustment function $f(\ )$ can be determined empirically from various backgrounds and new content colors rendered thereon.

FIG. 5 illustrates an exemplary lookup table that can be used to look up the opacity level adjustment to be applied to new content. The lookup table can be populated pre-processing using the computation described above. It should be understood that the lookup table is only an example of how the opacity level adjustments can be computed. Other mechanisms are also available according to various examples.

Referring again to FIG. 4, the adjusted new content can be rendered on top of the selected background content at the computed opacity level adjustment, thereby providing an appropriate transparency of the new content while preserving its color for consistent user perception (435).

After displaying the new content ends (440), the selected background content can be saturated back to its original saturation level (445). In some examples, the color desaturation filter can be reversed so as to render the original color data.

The method of FIG. 4 can repeat each time the background content changes prior to rendering new content so that the new content's color is preserved throughout. The method can similarly repeat each time different new content is rendered on top of the same background content so that the different colors of the new content are preserved. The method can further repeat at fixed intervals to ensure the preservation of new content colors.

Figure 6:
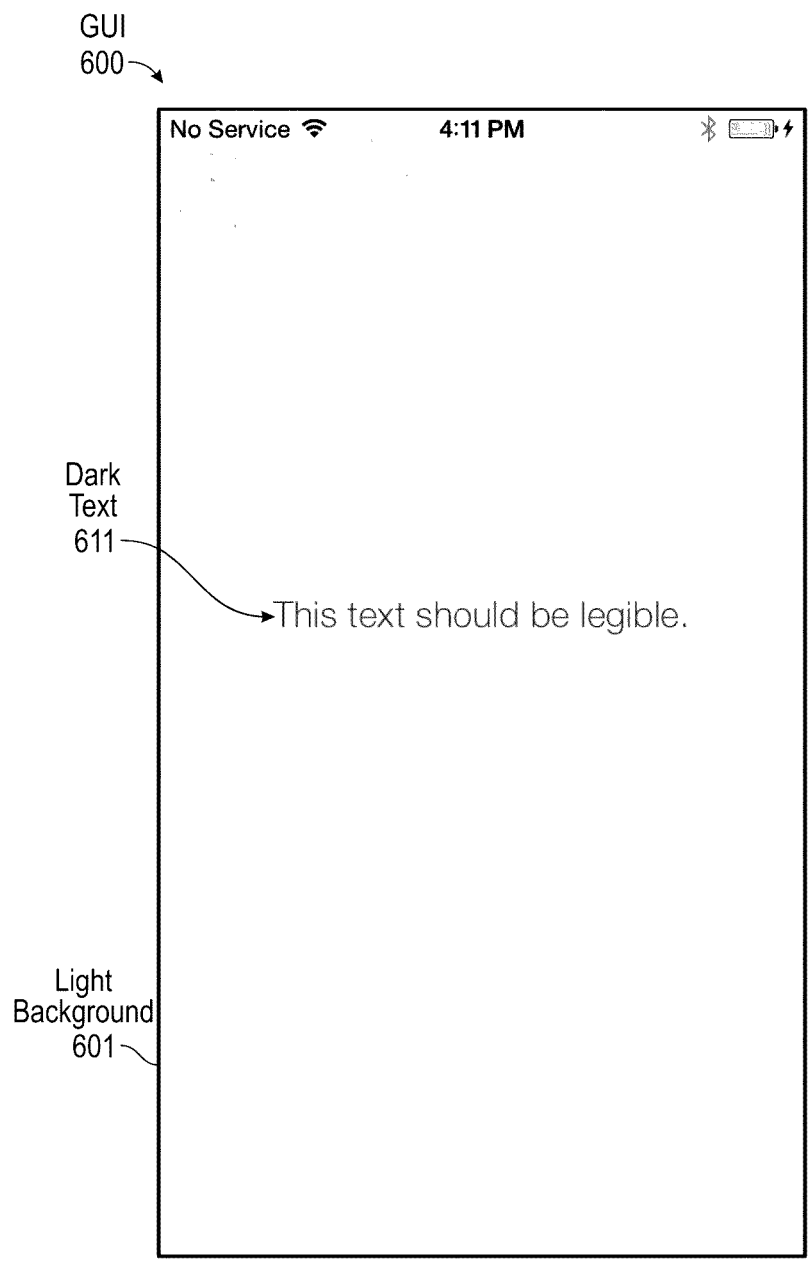
FIGS. 6 through 8 illustrate exemplary graphical user interfaces with color adjusted text legibly rendered on top of various backgrounds according to various examples.
Figure 7:
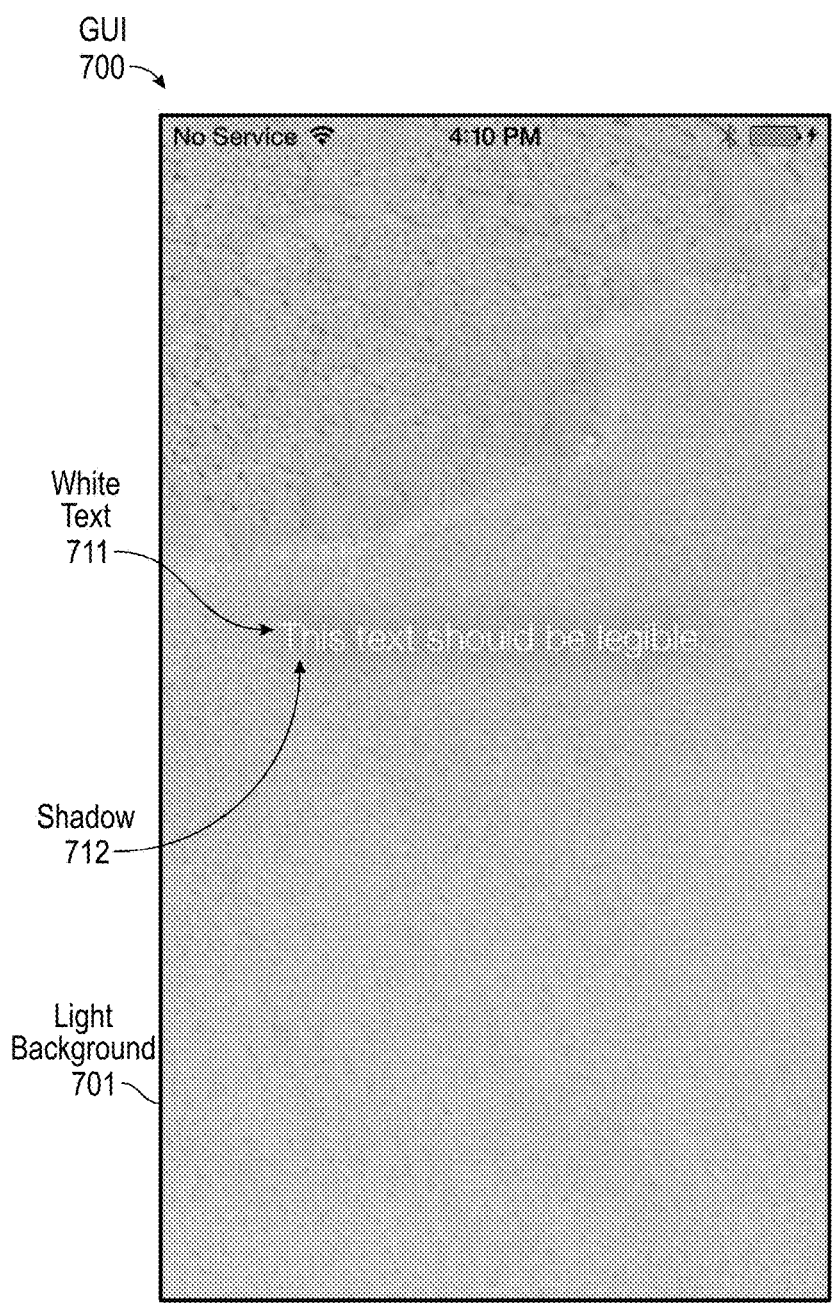
Figure 8:
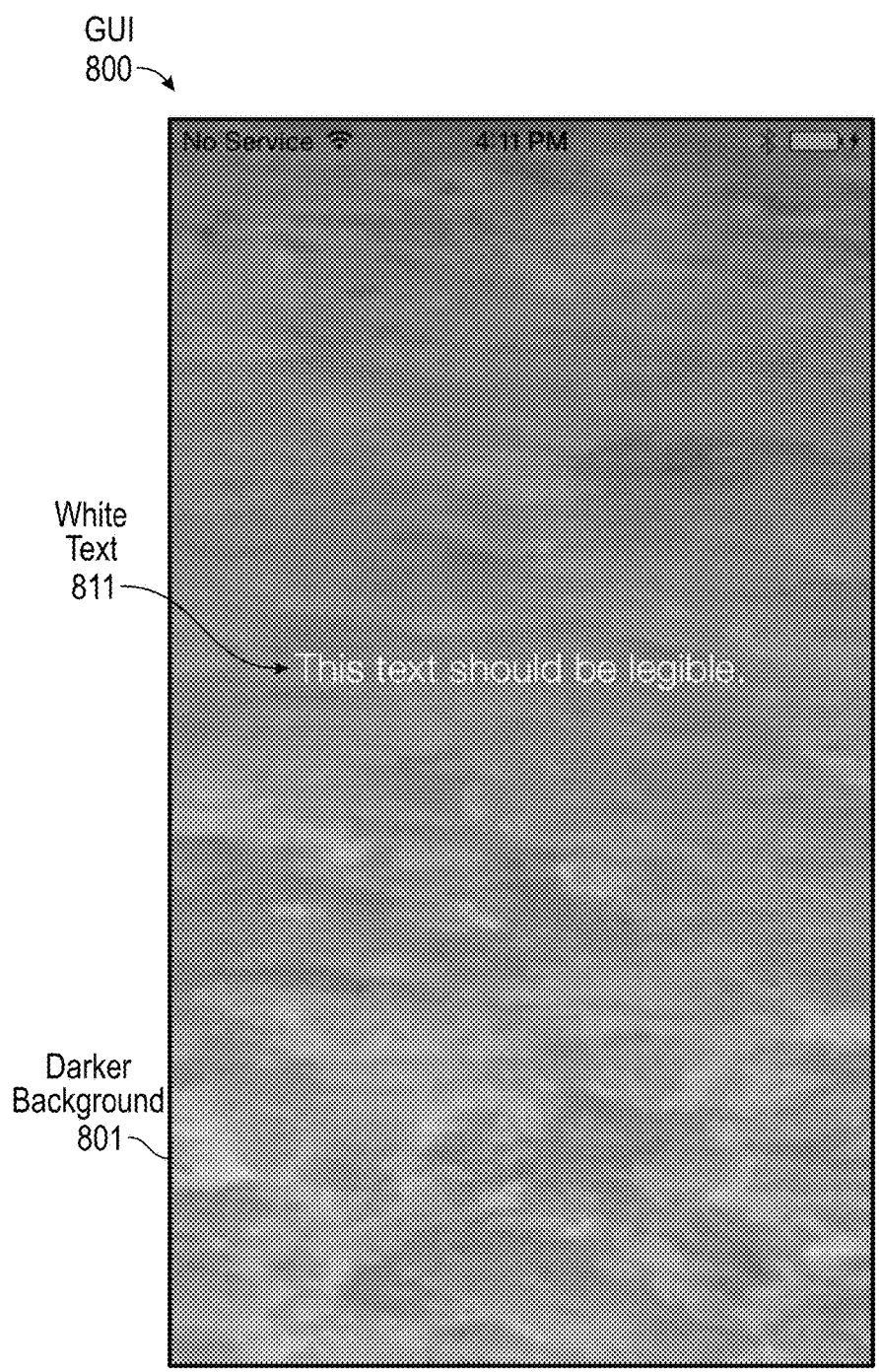

FIGS. 6 through 8 illustrate exemplary graphical user interfaces in which text can be rendered on top of background content, where certain characteristics of the text can be adjusted so as to be legible regardless of the color and/or texture of the background content. As such, a user can clearly read text on various backgrounds. In the example of FIG. 6, graphical user interface 600 can include dark text 611 on light background 601. The text 611 can be rendered in a dark color so as to be legible against the light, almost white, background content 601. How dark and what color the text 611 is can be a function of how light and what color the background content 601 is. For example, a lighter orange background can have a darker brown text because brown provides an aesthetically pleasing and legible contrast to the background. In the example of FIG. 7, graphical user interface 700 can include white text 711 with shadow 712 surrounding the text on light background 701. The shadow 712 can be rendered around the white text 711 to help the legibility of the text on the light background 701. How visible the shadow 712 is can be a function of how light the background content 701 is. For example, a lighter, almost white, background can have a more visible shadow around the white text to make the text legible. Whereas, an off-white or tan background can have a less visible shadow around the white text to make the text legible. In the example of FIG. 8, graphical user interface 800 can include white text 811 on darker background 801. The text 811 can be rendered in a white color so as to be legible against the darker, more colorful, background content 801. Because of the darkness of the background content 801, a shadow can be either less visible or omitted entirely from the text 811.

Figure 9:
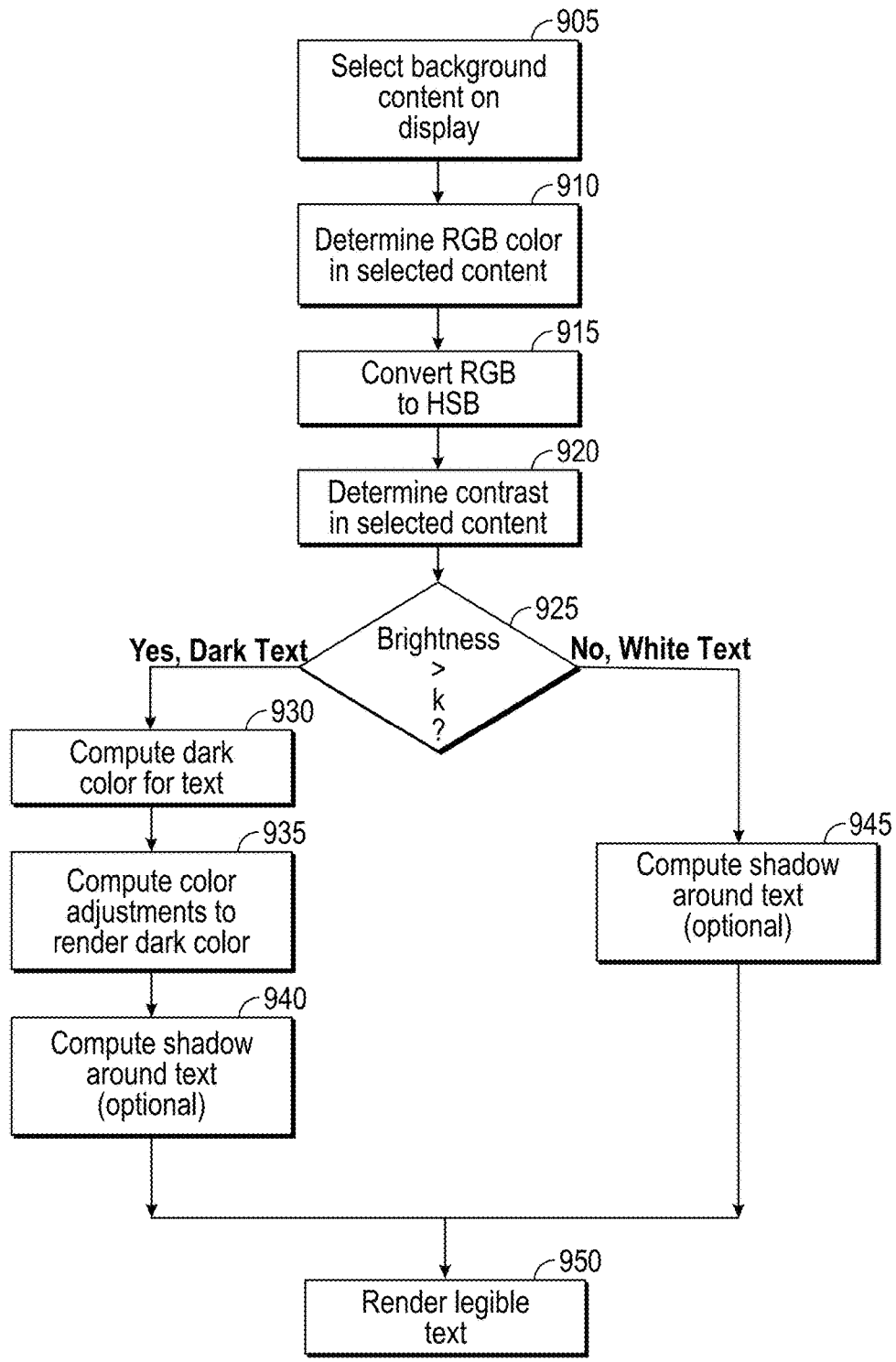
FIG. 9 illustrates an exemplary method for adjusting legibility of text to be rendered on top of background content in a graphical user interface according to various examples.

FIG. 9 illustrates an exemplary method to adjust certain characteristics of text based on background content in a graphical user interface so that the text is legible, as illustrated in FIGS. 6 through 8, for example. In the example of FIG. 9, background content in a graphical user interface can be selected and sampled (905). In some examples, the selected background content can be the entire background, such that text adjustments are the same throughout the user interface so as to be unobtrusive to the user. In some examples, the selected background content can be that corresponding to the location where the text is to be rendered, such that text adjustments are different throughout the user interface to provide different text colors, which may be desirable for a particular user interface and/or user. The average red, green, and blue (RGB) values of the selected background content can be determined (910). The average RGB values can be converted to average hue, saturation, and brightness (HSB) values for further processing (915). The average contrast of the selected background content can also be determined (920).

Prior to rendering text on top of background content, how light the background content is can be ascertained so as to determine how to render legible text. To do so, the brightness of the background content can be compared to threshold K (925). In some examples, K=80, based on empirical analysis of various backgrounds and legible text colors thereon. If the brightness of the background content exceeds the threshold K, then the background content can be considered very light such that dark text should be rendered for legibility. The dark color to be rendered can be computed based on the average hue, saturation, and brightness of the background content so as to provide legible text, as well as text that is aesthetically pleasing against the background colors (930). The computation can be formulated as: $N_i = f(H_i, S_i, B_i)$, where $N_i$=the dark color of the text, $f(\ )$=the adjustment function, $H_i$=the average hue of the selected background content, $S_i$=the average saturation of the selected background content, and $B_i$=the average brightness of the selected background content. In some examples, the adjustment function $f(\ )$ can be determined empirically based on various backgrounds and text colors rendered thereon.

FIG. 10 illustrates an exemplary lookup table that can be used to look up the dark color of the text to be rendered. The lookup table can be populated pre-processing using the computation described above. It should be understood that the lookup table is only an example of how the dark colors can be computed. Other mechanisms are also available according to various examples.

Referring again to FIG. 9, given the default text color of white, the hue, saturation, and brightness adjustments to the white color can be computed to provide the computed dark color (935). Optionally, a shadow can be computed to surround the dark text, as needed, to assist legibility (940). How visible the shadow is or whether the shadow is rendered at all can be a function of the how light and what color the background content is. The dark text can be rendered on top of the selected background content at the computed dark color, thereby providing legible text for the user (950).

If the brightness of the background content does not exceed the threshold K, then the background content can be considered darker such that default white text should be rendered for legibility (925). Optionally, a shadow can be computed to surround the white text, as needed, to assist legibility (945). How visible the shadow is or whether the shadow is rendered at all can be a function of the average brightness of the background content. The white text and appropriate shadow can be rendered on top of the selected background content, thereby providing legible text for the user (950).

The method of FIG. 9 can repeat each time the background content changes prior to rendering text so that the text is legible. The method can further repeat at fixed intervals to ensure the text remains legible.

Figure 11:
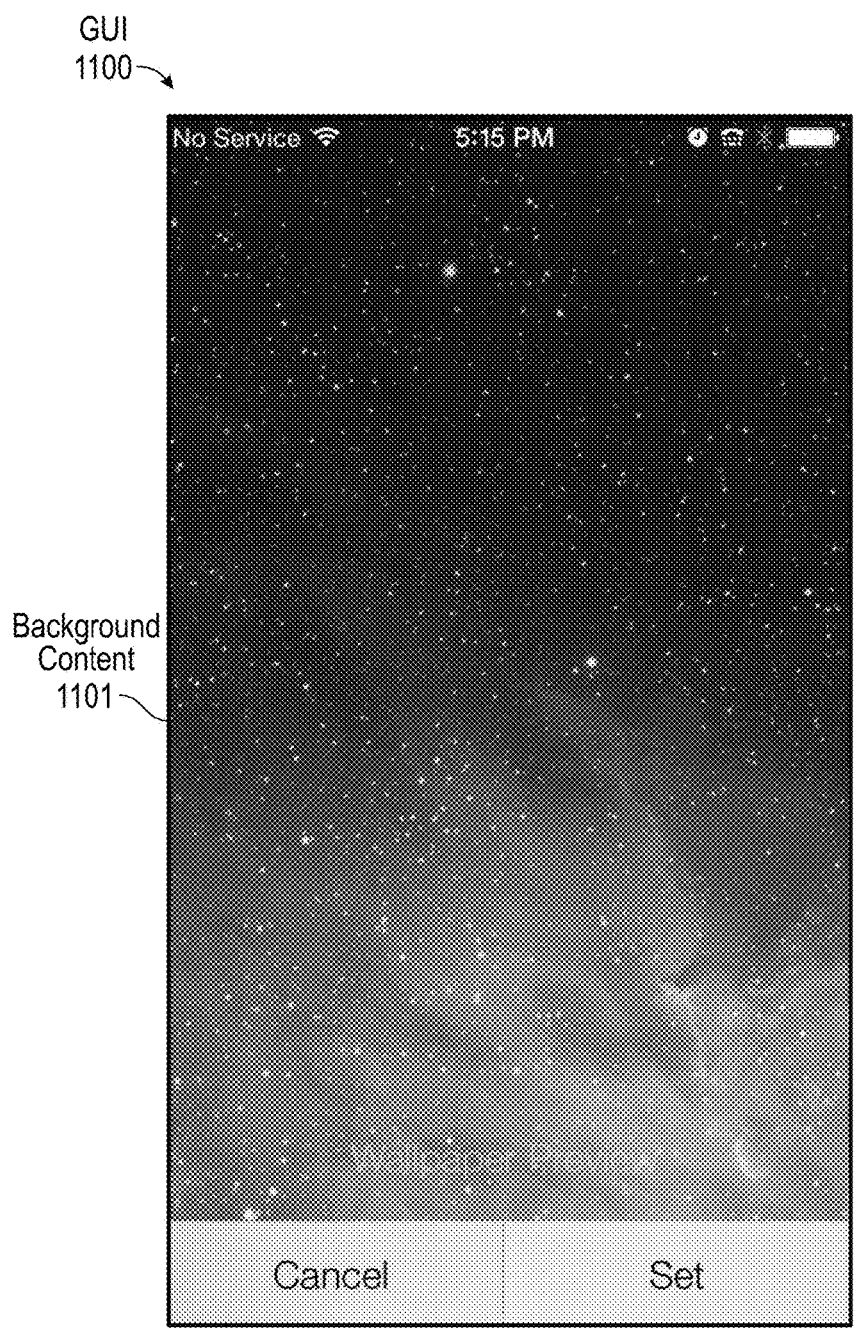
FIGS. 11 through 22 illustrate exemplary graphical user interfaces with adjusted new content legibly rendered on top of various backgrounds according to various examples.
Figure 12:
Figure 13:
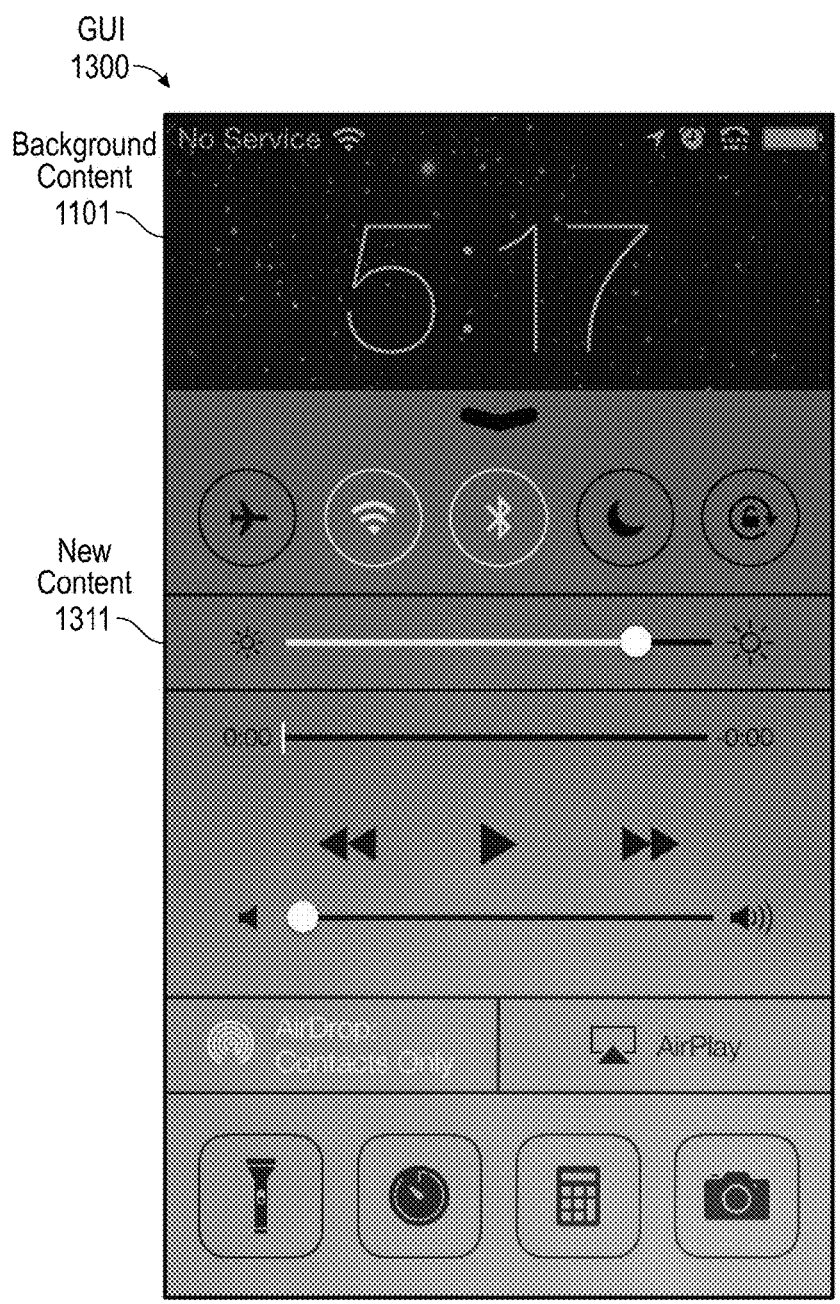

FIGS. 11 through 22 illustrate exemplary graphical user interfaces in which new content can be rendered on top of background content, where certain characteristics of the new content can be adjusted so as to be legible regardless of the background content. Accordingly, a user can easily see and read the new content on various backgrounds. In the example of FIG. 11, graphical user interface 1100 can include background content 1101 depicting a night sky with a variety of colors. This content 1101 can typically serve as wallpaper in a device display. In the example of FIG. 12, graphical user interface 1200 can include new content 1211 depicting a dialer interface on top of the background content 1101. As can be seen in FIG. 12, the graphics and text in the dialer interface are legible on the night sky background. In the example of FIG. 13, graphical user interface 1300 can include new content 1311 depicting a control center interface on top of portions of the background content 1101. As can be seen in FIG. 13, the graphics and text in the control center interface are legible on the night sky background. The upper portion of the night sky background content not covered by the control center interface can remain unchanged.

Figure 14:
Figure 15:
Figure 16:
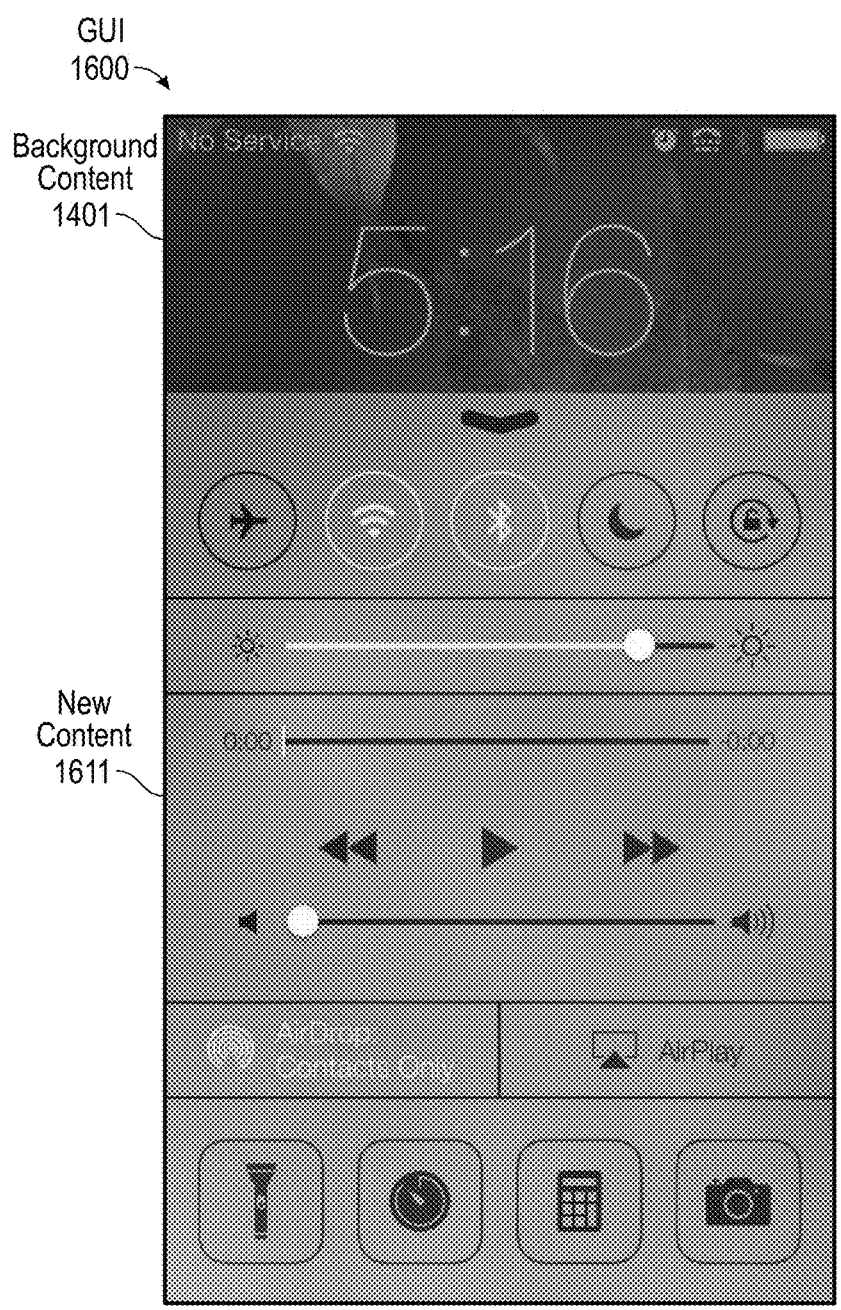
Figure 17:
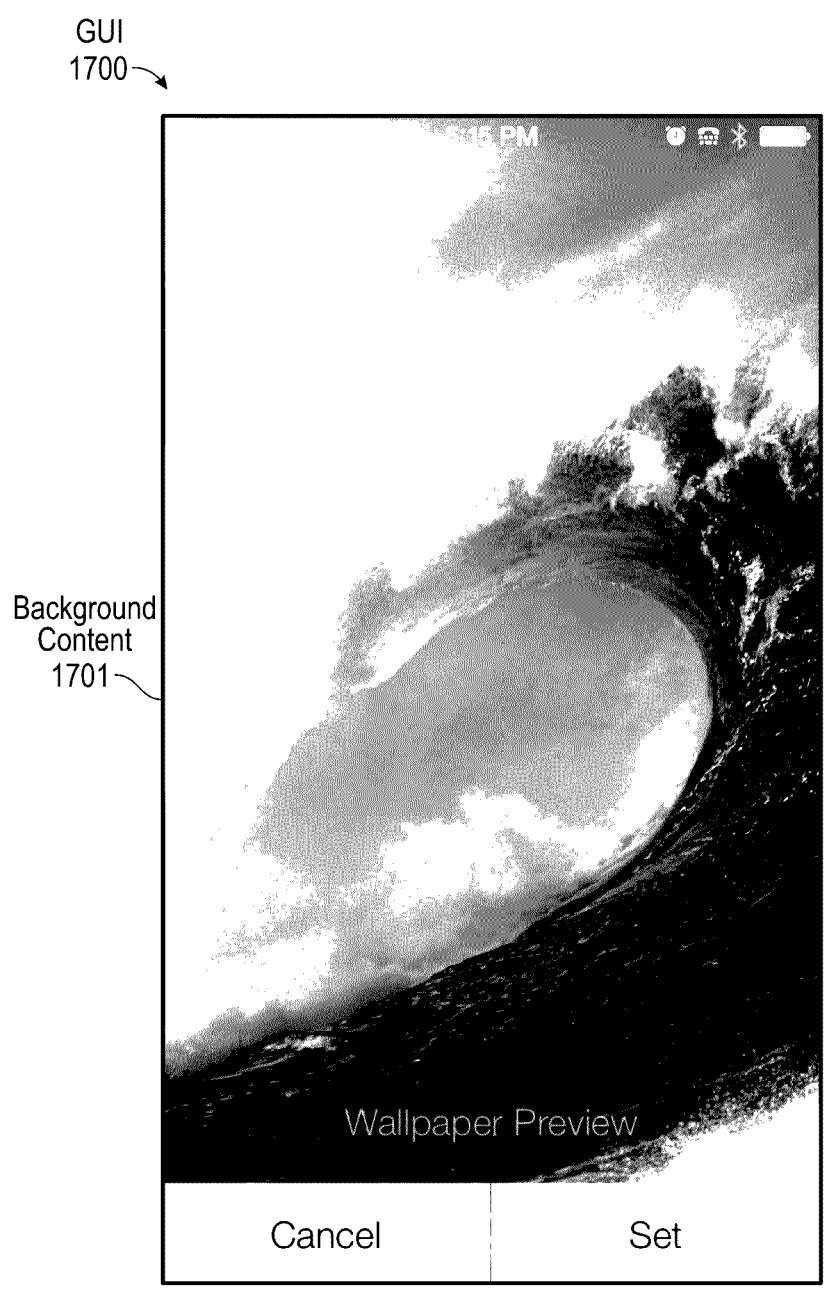
Figure 18:
Figure 19:
Figure 20:
Figure 21:
Figure 22:

Similarly, FIGS. 14 through 16, depicting graphical user interfaces 1400-1600, illustrate background content 1401 depicting fall leaves with a variety of colors. As can be seen in FIGS. 15 and 16, the contents of the dialer and control center interfaces are legible on the fall leaves background. FIGS. 17 through 19, depicting graphical user interfaces 1700-1900, illustrate background content 1701 depicting ocean waves, where the contents of the dialer and control center interfaces are legible on the ocean waves background. FIGS. 20 through 22, depicting graphical user interfaces 2000-2200, illustrate background content 2001 depicting a tulip, where the contents of the dialer and control center interfaces are legible on the tulip background. As a result, a user viewing the dialer and control center interfaces in different backgrounds can easily see and read the interfaces.

Figure 23:
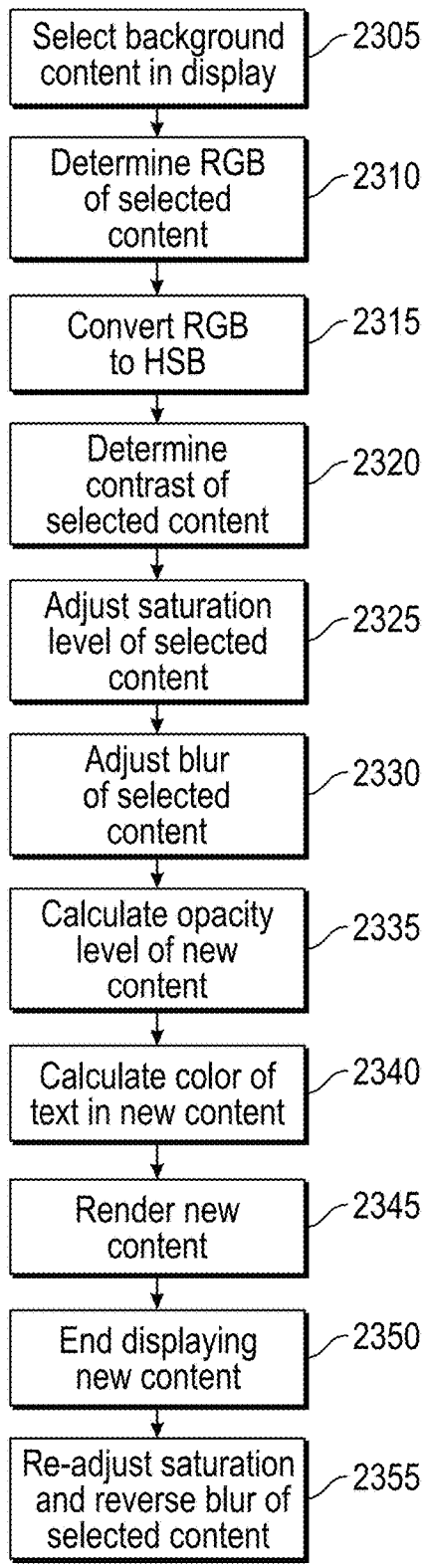
FIG. 23 illustrates an exemplary method for adjusting legibility of new content to be rendered on top of background content in a graphical user interface according to various examples.

FIG. 23 illustrates an exemplary method to adjust certain characteristics of both new content and background content based on the background content in a graphical user interface so that the new content is legible, as illustrated in FIGS. 11 through 22, for example. In the example of FIG. 23, background content in a graphical user interface can be selected and sampled (2305). In some examples, the selected background content can be that corresponding to the position in the user interface at which the new content is to be rendered. In some examples, the selected background content can be the entire background. The selection can depend on the nature and size of the new content to be rendered. The average red, green, and blue (RGB) values of the selected background content can be determined (2310). The average RGB values can be converted to average hue, saturation, and brightness (HSB) values for further processing (2315). The average contrast of the selected background content can also be determined (2320).

Prior to rendering new content on top of background content, the saturation level of the background content can be adjusted to grayscale so as to prevent the colors in the selected background content from appreciably interfering with the legibility of the new content (2325). A blur operation can similarly be applied to the selected background content based on color characteristics of the background content (2230). In some examples, the blur amount and blur radius applied to the selected background content can be based on the content's brightness so as to prevent the background content from appreciably interfering with the legibility of the new content.

As described in FIG. 4, the opacity level of the new content can be adjusted so as to provide an appropriate level of transparency of the new content, while maintaining legibility (2235). As described in FIG. 9, the color of the text in the next content can also be adjusted so as to be legible against the background content (2340). The adjusted new content can be rendered on top of the selected background content at the computed opacity level adjustment and text colors, thereby providing an appropriate transparency of the new content while preserving its legibility (2345).

After displaying the new content ends (2350), the selected background content can be saturated back to its original saturation level and the blur removed (2355). In some examples, a color desaturation filter can be reversed so as to render the original color data. In some examples, the blur operation can be reversed so as to render the original resolution of the background content.

The method of FIG. 23 can repeat each time the background content changes prior to rendering new content so that the new content is legible. The method can similarly repeat each time different new content is rendered on top of the same background content so that the different new content is legible. The method can further repeat at fixed intervals to ensure legibility.

Figure 24:
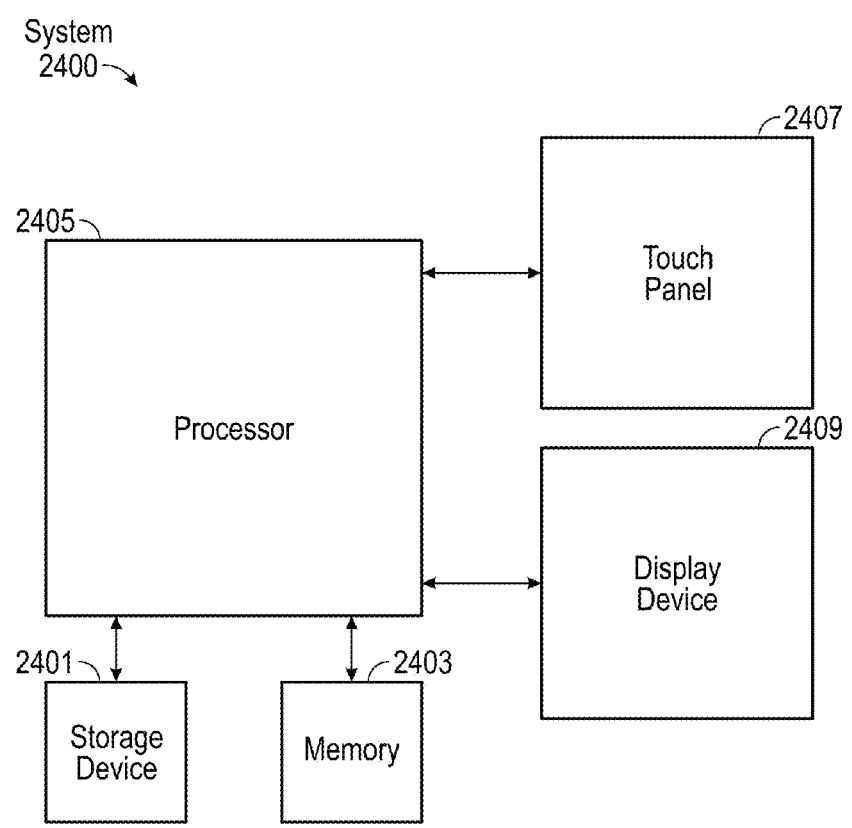
FIG. 24 illustrates an exemplary system for adjusting new content based on background content in a graphical user interface according to various examples.

One or more of the graphical user interfaces can operate in a system similar or identical to system 2400 shown in FIG. 24. System 2400 can include instructions stored in a non-transitory computer readable storage medium, such as memory 2403 or storage device 2401, and executed by processor 2405. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 2400 can also include display device 2409 coupled to the processor 2405. The display device 2409 can be used to display any of the graphical user interfaces described in FIGS. 1 through 23. The system 2400 can further include touch panel 2407 coupled to the processor 2405. Touch panel 2407 can have touch nodes capable of detecting an object touching or hovering over the panel at a location corresponding to a graphical user interface on the display device 2409. The processor 2405 can process the outputs from the touch panel 2407 to perform actions based on the touch or hover event and the displayed graphical user interface.

It is to be understood that the system is not limited to the components and configuration of FIG. 24, but can include other or additional components in multiple configurations according to various examples. Additionally, the components of system 2400 can be included within a single device, or can be distributed between multiple devices. In some examples, the processor 2405 can be located within the touch panel 2407 and/or the display device 2409.

Figure 25:
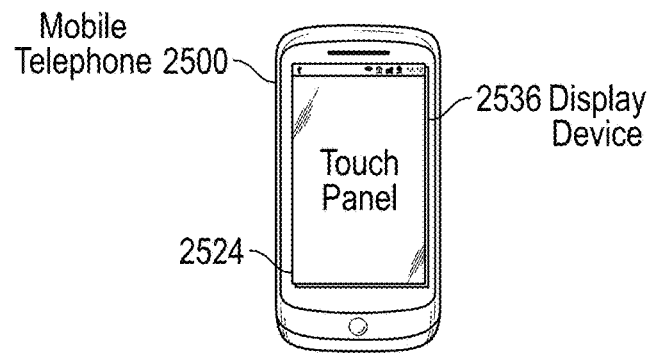
FIGS. 25 through 27 illustrate exemplary personal devices that can be used to adjust new content based on background content in graphical user interfaces on the devices according to various examples.

FIG. 25 illustrates an exemplary mobile telephone 2500 that can include touch panel 2524, display 2536, and other computing system blocks that can adjust new content based on background content rendered in the display according to various examples.

Figure 26:
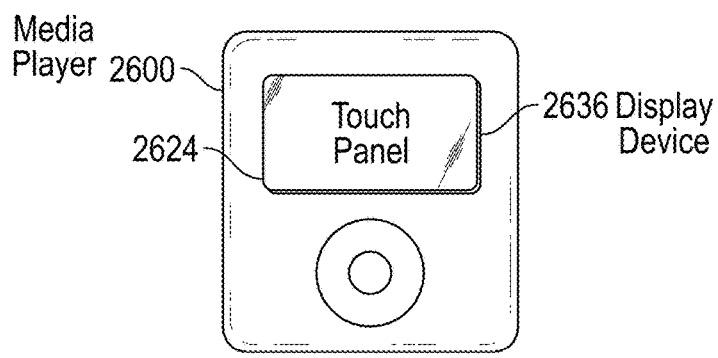

FIG. 26 illustrates an exemplary digital media player 2600 that can include touch panel 2624, display 2636, and other computing system blocks that can adjust new content based on background content rendered in the display according to various examples.

Figure 27:
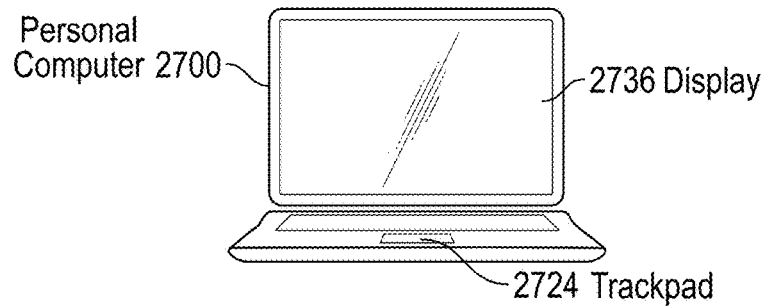

FIG. 27 illustrates an exemplary personal computer 2700 that can include touch panel (trackpad) 2724, display 2736, and other computing system blocks that can adjust new content based on background content rendered in the display according to various examples.

The mobile telephone, media player, and personal computer of FIGS. 25 through 27 can improve the user experience with a more visually pleasing graphical user interface according to various examples.

Therefore, according to the above, some examples of the disclosure are directed to a method comprising: selecting background content in a graphical user interface; and adjusting a color characteristic of new content to be displayed in the user interface based on at least one color characteristic of the selected background content. Additionally or alternatively to one or more examples disclosed above, the selecting comprises selecting a portion of the background content corresponding to a location in the user interface at which the new content is displayed. Additionally or alternatively to one or more examples disclosed above, the adjusting comprises adjusting an opacity level of the new content based on the at least one color characteristic of the selected background content. Additionally or alternatively to one or more examples disclosed above, the at least one color characteristic of the selected background content comprises at least one of color, hue, saturation, brightness, or contrast. Additionally or alternatively to one or more examples disclosed above, the adjusting comprises adjusting the color of the new content to preserve an original color of the new content regardless of the at least one color characteristic of the selected background content. Additionally or alternatively to one or more examples disclosed above, the method further comprises: determining a first set of color data of the selected background content; and converting the first set to a second set of color data, wherein the at least one color characteristic of the selected background content includes the second set of color data. Additionally or alternatively to one or more examples disclosed above, the first set of color data includes average red, green, and blue data values of the selected background content, and the second set of color data includes average hue, saturation, and brightness data values of the selected background content. Additionally or alternatively to one or more examples disclosed above, the method further comprises determining an average contrast of the selected background content. Additionally or alternatively to one or more examples disclosed above, the method further comprises lowering a saturation level of the selected background content prior to displaying the new content to display grayscale data. Additionally or alternatively to one or more examples disclosed above, the method further comprises increasing a saturation level of the selected background content after ending the displaying of the new content to return to an original saturation level.

Other examples of the disclosure are directed to an electronic device comprising: a display; and a processor configured to render a graphical user interface with background content on the display, determine new content to be rendered in the user interface, the new content being a first color, determine a color characteristic of the background content at a location corresponding to a location at which the new content is rendered, adjust the first color of the new content based on the color characteristic of the background content at the corresponding location, and render the adjusted new content so as to visually preserve the first color when rendered to overlay the background content. Additionally or alternatively to one or more examples disclosed above, the device comprises at least one of a mobile phone, a media player, or a portable computer.

Other examples of the disclosure are directed to a non-transitory computer readable storage medium comprising instructions that, when executed by a processor, cause the processor to: render a graphical user interface having background content, select at least a portion of the background content, adjust a color of new content to be rendered to overlay the selected background content, the adjustment based on at least one color characteristic of the selected background content, and render the adjusted new content in the user interface.

Other examples of the disclosure are directed to a method comprising: selecting background content in a graphical user interface; determining at least one characteristic of the selected background content; and adjusting a legibility of text in the user interface based on the at least one characteristic of the selected background content. Additionally or alternatively to one or more examples disclosed above, the selecting comprises selecting the entire background content in the user interface. Additionally or alternatively to one or more examples disclosed above, the adjusting comprises changing a color of the text. Additionally or alternatively to one or more examples disclosed above, the adjusting comprises changing a visibility of a shadow around the text. Additionally or alternatively to one or more examples disclosed above, the at least one characteristic includes at least one of color, hue, saturation, brightness, or contrast. Additionally or alternatively to one or more examples disclosed above, the method further comprising: determining a threshold of the at least one characteristic, the threshold indicative of brightness. Additionally or alternatively to one or more examples disclosed above, the method further comprising: comparing the threshold to a value of the at least one characteristic; if the value exceeds the threshold, adjusting the text to be a dark color; and otherwise, adjusting a visibility of a shadow around the text. Additionally or alternatively to one or more examples disclosed above, the adjusting the text to be a dark color comprises: determining the dark color based on the at least one characteristic of the background content; and adjusting at least one color characteristic of the text to provide the dark color.

Other examples of the disclosure are directed to a method comprising: selecting background content in a graphical user interface; determining at least one color characteristic of the selected background content; adjusting a characteristic of the selected background content based on the at least one color characteristic; and adjusting a legibility of new content in the user interface based on the at least one color characteristic of the selected background content. Additionally or alternatively to one or more examples disclosed above, the adjusting of a characteristic of the selected background content comprises: adjusting a saturation level of the selected background content. Additionally or alternatively to one or more examples disclosed above, the adjusting of a characteristic of the selected background content comprises: blurring the selected background content. Additionally or alternatively to one or more examples disclosed above, the adjusting of the legibility of the new content comprises: adjusting an opacity level of the new content based on the at least one color characteristic of the selected background content; and changing a color of text in the new content based on the at least one color characteristic of the selected background content.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method comprising:
   at an electronic device with a display:
   rendering a graphical user interface with background content on the display;
   determining new content to be rendered in the graphical user interface, the new content being a first color;
   determining a color characteristic of the background content at a location corresponding to a location at which the new content is to be rendered;
   adjusting a color characteristic of the new content in the graphical user interface based on the color characteristic of the background content at the corresponding location such that the first color is maintained when the new content is rendered on the display; and
   rendering the adjusted new content on top of the background content.

2. The method of claim 1, wherein the adjusting comprises adjusting the color characteristic of the new content to preserve an original color of the new content regardless of the color characteristic of the background content at the corresponding location.

3. The method of claim 1, comprising:
   prior to rendering the adjusted new content on top of the background content, lowering a saturation level of the background content at the corresponding location to display grayscale data.

4. The method of claim 1, comprising:
   after ending display of the new content, increasing a saturation level of the background content at the corresponding location to an original saturation level.

5. The method of claim 1, wherein grayscale data for the background content at the corresponding location is displayed while the new content is displayed on top of the background content.

6. The method of claim 1, wherein a saturation level of the background content at the corresponding location is raised, after ending display of the new content, to a level that was displayed prior to displaying the new content on top of the background content.

7. An electronic device comprising:
   a display;
   a processor;
   memory; and
   instructions, stored in the memory, that when executed by the processor cause the device to:
   render a graphical user interface with background content on the display,
   determine new content to be rendered in the graphical user interface, the new content being a first color,
   determine a color characteristic of the background content at a location corresponding to a location at which the new content is to be rendered,
   adjust a color characteristic of the new content in the graphical user interface based on the color characteristic of the background content at the corresponding location such that the first color is maintained when the new content is rendered on the display, and
   render the adjusted new content on top of the background content.

8. The electronic device of claim 7, wherein adjusting the color characteristic of the new content preserves an original color of the new content regardless of the color characteristic of the background content at the corresponding location.

9. The electronic device of claim 7, including instructions that cause the device to, prior to rendering the adjusted new content on top of the background content, lower a saturation level of the background content at the corresponding location to display grayscale data.

10. The electronic device of claim 7, including instructions that cause the device to, after ending display of the new content, increase a saturation level of the background content at the corresponding location to an original saturation level.

11. The electronic device of claim 7, wherein grayscale data for the background content at the corresponding location is displayed while the new content is displayed on top of the background content.

12. The electronic device of claim 7, wherein a saturation level of the background content at the corresponding location is raised, after ending display of the new content, to a level that was displayed prior to displaying the new content on top of the background content.

13. A non-transitory computer readable storage medium comprising instructions that, when executed by a processor in an electronic device with a display, cause the device to:
   render a graphical user interface with background content on the display,
   determine new content to be rendered in the graphical user interface, the new content being a first color,
   determine a color characteristic of the background content at a location corresponding to a location at which the new content is to be rendered,
   adjust a color characteristic of the new content in the graphical user interface based on the color characteristic of the background content at the corresponding location such that the first color is maintained when the new content is rendered on the display, and
   render the adjusted new content on top of the background content.

14. The non-transitory computer readable storage medium of claim 13, wherein adjusting the first color characteristic of the new content preserves an original color of the new content regardless of the color characteristic of the background content at the corresponding location.

15. The non-transitory computer readable storage medium of claim 13, including instructions that cause the device to, prior to rendering the adjusted new content on top of the background content, lower a saturation level of the background content at the corresponding location to display grayscale data.

16. The non-transitory computer readable storage medium of claim 13, including instructions that cause the device to, after ending display of the new content, increase a saturation level of the background content at the corresponding location to an original saturation level.

17. The non-transitory computer readable storage medium of claim 13, wherein grayscale data for the background content at the corresponding location is displayed while the new content is displayed on top of the background content.

18. The non-transitory computer readable storage medium of claim 13, wherein a saturation level of the background content at the corresponding location is raised, after ending display of the new content, to a level that was displayed prior to displaying the new content on top of the background content.

* * * * *